United States Patent

[11] 3,556,083

| [72] | Inventors | James A. Grichnik<br>Park Ridge;<br>Joel J. Schmutzer, Oak Park, Ill. |
|---|---|---|
| [21] | Appl. No. | 725,994 |
| [22] | Filed | May 2, 1968 |
| [45] | Patented | Jan. 19, 1971 |
| [73] | Assignee | Beckman Instruments, Inc.<br>a corporation of California |

[54] APPARATUS FOR MEASUREMENT OF ELECTRODERMAL PHENOMENA
7 Claims, 2 Drawing Figs.

| [52] | U.S. Cl. | 128/2.1 |
|---|---|---|
| [51] | Int. Cl. | A61f 5/05 |
| [50] | Field of Search | 128/2.05M, 2.06, 2.08, 2.1 |

[56] References Cited
UNITED STATES PATENTS

| 2,308,933 | 1/1943 | Roesler | 128/2.1 |
|---|---|---|---|
| 2,799,269 | 7/1957 | Mathison | 128/2.1 |
| 3,382,434 | 5/1968 | Gibson, Jr. et al. | 128/2.1X |
| 3,395,698 | 8/1968 | Morehouse | 128/2.05 |
| 3,412,728 | 11/1968 | Smith, Jr. | 128/2.05 |
| 3,468,302 | 9/1969 | Cowell | 128/2.1 |

OTHER REFERENCES

Plumb et al. " Institute of Electrical and Electronic Engineers Transactions on BioMedical Engineering," Vol. BME-11, No. 4, pp. 157— 159, Oct. 1964 (copy in 128-2.1).

*Primary Examiner*—William E. Kamm
*Attorneys*—Richard M. Jennings and Robert J. Steinmeyer

ABSTRACT: An operational amplifier applies either constant voltage or constant current to a subject in order to provide an output voltage directly proportional to the subject's conductance or resistance for recording together with superimposed sharp pulses produced by a voltage-to-time interval converter, the time interval between successive pulses being proportional to the average basal electrodermal phenomena, basal resistance or basal conductance. Means for automatically suppressing the average basal electrodermal phenomena from the signal being recorded is provided.

APPARATUS FOR MEASUREMENT OF
ELECTRODERMAL PHENOMENA

BACKGROUND OF THE INVENTION

1. Field of the Invention

This invention relates to the field of measurement of electrodermal phenomena and in particular to measuring and recording changes in electrodermal phenomena in response to a constant electrical signal, voltage or current, accompanying emotional and other stresses of a subject.

2. Description of the Prior Art

Apparatus for measuring and recording electrodermal phenomena accompanying emotional and other stresses of a subject have come into widespread use, particularly in connection with such phenomena accompanying psychologically induced stresses in what has come to be popularly known as a "lie detector." Although much is known about electrodermal phenomena and more particularly about changes in such phenomena in response to emotional and other stresses, much information is still lacking as to variables affecting such phenomena sometimes referred to as skin resistance (R) and galvanic skin response (GSR). For a discussion of some of the problems, reference is made to an article titled "Skin Resistance and Galvanic Skin Response" published by Robert Edelberg et al. in the Archives of General Psychiatry, Vol. 7, Sept. 1962, at pages 163 through 169 and an article titled "-Problems in Measurement of Electrodermal Phenomena—Choice of Method and Phenomena—Potential, Impedance, Resistance" by T. W. Forbes published in Psychophysiology, Vol. 1, No. 1, July 1964, at pages 26 to 30.

A problem in fully understanding electrodermal phenomena accompanying emotional and other stresses has been the difficulty in producing a record which enables the researcher making the measurement to record the response or changes in phenomena in such a way as to always be able to distinguish between such response and the average basal electrodermal phenomena present. No apparatus for measuring and recording electrodermal phenomena has been known to provide means for automatically subtracting basal phenomena. Normal basal suppression methods have been employed to display only the AC component (changes in electrodermal phenomena), but such methods have been unsatisfactory because constant readjustment of the basal control is necessary to compensate for changes in the basal phenomena due, for example, to changes in environmental conditions and not to emotional and other stresses in which the researcher is interested.

SUMMARY

The problems of the prior art are solved in apparatus for measuring and recording electrodermal phenomena accompanying emotional and other stresses by a low pass filter for continually extracting a direct current component of an electrical signal derived from electrodes (connected to a subject at different sites) to which a constant electrical signal is applied to thereby establish a constant electrical stimulus field between the two sites. The extracted direct current component is then subtracted from the derived signal to thereby record only changes in electrodermal phenomena accompanying emotional and other stresses. Means for temporarily reducing the time constant of the low pass filter is provided while adjusting the recorder, such as while centering the recording stylus on a continuously moving record medium or, in the case of recording on the face of a cathode ray tube, while centering the beam on the face thereof. For greater flexibility in the hands of the researcher, means is provided for voltage dividing the direct current component to be subtracted. Thus by subtracting only a fraction of the total direct current component, a portion of the basal phenomena will remain for recording, but at a much lower sensitivity than the changes in the electrodermal phenomena.

In order that the average basal phenomena be displayed at all times, even while it is being fully subtracted from the record being made, a time interval converter is provided consisting of an integrator coupled to receive the full electrodermal phenomena signal and a threshold device so connected to the integrator as to reset it when the integrated signal therein reaches a predetermined level and, in response to such resetting of the integrator, for producing a sharp pulse coupled to the recorder as a superimposed sharp pulse on the electrodermal phenomena signal being recorded. If desired, the basal phenomena may also be recorded simultaneously in a second channel of the recorder by coupling the output of the low pass filter thereto through a second amplifier.

DESCRIPTION OF THE PREFERRED EMBODIMENT

Figure 1:
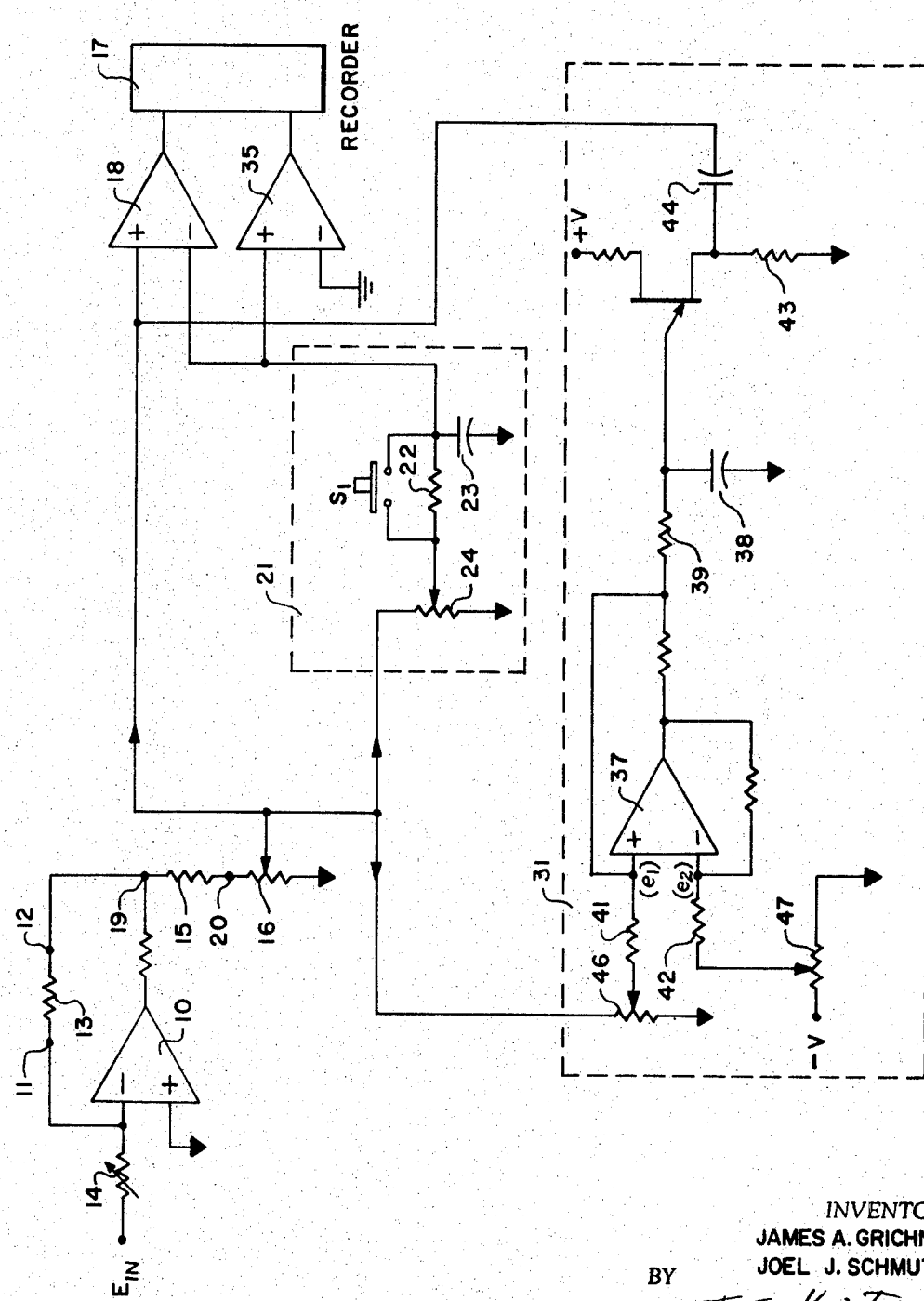
FIG. 1 is a schematic diagram of apparatus for measuring and recording electrodermal phenomena accompanying emotional and other stresses in accordance with the present invention.

The present invention disclosed in FIG. 1 makes use of an operational amplifier 10 to apply either constant current or constant voltage to a subject and to provide an output voltage directly proportional to the subject's resistance or conductance. For operation in the constant current mode, the subject is connected between electrodes 11 and 12 such that the subject appears as a feedback resistor 13 in the operational amplifier. There are many different suitable types of electrodes which may be used, such as Ag-AgCl electrodes.

The variable resistor 14 connected to a source of voltage $E_{in}$ is adjusted for the desired level of feedback current $I_f$ through the subject. If $E_{in}$ remains constant, the feedback current $I_f$ through the subject is constant. Therefore, the output signal from the electrode 12 in ohmic contact with the subject is directly proportional to the resistance of the subject. A voltage dividing resistor 15 and a potentiometer 16 adjust the level of the signal to be applied to a recorder 17 through a differential amplifier 18.

In the constant voltage mode of operation, a resistor is substituted for the subject in the feedback circuit such that electrodes 11 and 12 are then simply terminals connected to a fixed resistor 13. The subject is then connected between terminals 19 and 20 in place of the fixed resistor 15 using the electrodes previously used at terminals 11 and 12. if $E_{in}$ is again maintained constant, the output voltage $E_o$ at terminal 19 is also constant. Variations in the current through the subject connected between terminals 19 and 20 is then detected as a voltage signal across the potentiometer 16 of about 2,000 ohms. That voltage signal is proportional to the conductance of current through the subject connected between the terminals 19 and 20.

If the magnitude of resistor 16 approaches that of the patient there will be an error represented by the ratio of the resistances to the voltage appearing across the patient. This may be eliminated by connecting a resistor equal to resistor 13 from terminal 20 to the noninverting input of amplifier 10 marked with a + which is grounded in turn through a resistor equal to resistor 14. The voltage across potentiometer 16 is then fed back and maintains the voltage across the patient constant. Thus, whether the operational amplifier be employed as a constant voltage or a constant current source to be applied to a subject, an output voltage directly proportional to the subject's electrodermal phenomena (conductance or resistance) is transmitted to one input terminal of the differential amplifier 18. In both the constant current and constant voltage applications it is desirable to minimize the possibility that other current return paths might occur. To avoid this the common terminals (depicted by the solid arrows—a conventional designation in the art) shown in FIG. 1 may be tied together and not grounded and a floating power supply provided referenced to the common terminals and not to ground.

The other input terminal of the differential amplifier 18 is connected to the potentiometer 16 through a low pass filter 21 (0.106 Hz) which automatically suppresses the average basal phenomena from the basal phenomena manifested by a voltage signal at the output of the potentiometer 16.

The filter 21 comprises a resistor 22 and a capacitor 23. A potentiometer 24 is provided in order to adjust the amount of the basal phenomena to be subtracted from the basal phenomena being recorded. When the movable contact of the potentiometer is at the terminal thereof closest to the moving contact of the potentiometer 16, substantially all of the direct current component of the signal being recorded is subtracted from it to provide continuous automatic basal suppression. By subtracting only a fraction of the basal phenomena through adjustment of the potentiometer 24, a portion will remain in the trace produced in the record 17, but at a much lower sensitivity than for the total electrodermal phenomena signal applied directly to the differential amplifier 18 from the potentiometer 16. A switch $S_1$ is provided to shunt the resistor 22 and thereby reduce the time constant of the filter 21 while adjusting the recorder 17 to place the trace being recorded thereon through the differential amplifier 18 at the center in a manner well known to those skilled in the operation of, for example, ink recorders or oscilloscopes.

Figure 2:
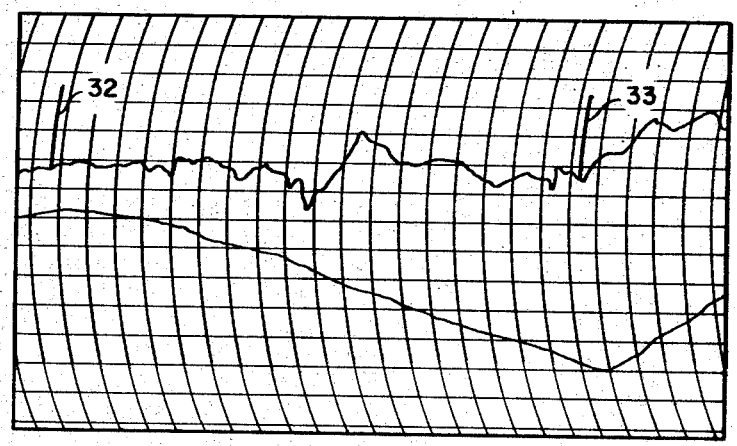
FIG. 2 shows a record of a measurement made with apparatus disclosed in FIG. 1.

When operating in the continuous automatic basal suppression mode, the signal coupled directly from the potentiometer 16 to the amplifier 18 is virtually AC coupled in that only changes in the electrodermal phenomena are then recorded by the amplifier 18. However, in that mode of operation there is no indication of the average value of the total signal voltage present at the potentiometer 16 and that may be of some interest to a researcher. Accordingly, a voltage-to-time interval converter 31 is connected in parallel with the direct connection from the potentiometer 16 to the differential amplifier 18 in order to superimpose on the voltage signal being recorded short pulses at time intervals directly proportional to the average basal phenomena (basal resistance when operating in the current mode and basal conductance when operating in the voltage mode). These marks are shown as sharp spikes 32 and 33 in the upper waveform shown in FIG. 2, which is the amplified and basal suppressed record of electrodermal phenomena accompanying emotional and other stresses of a subject. Since the speed of the record medium (the speed of the recording trace along the horizontal axis) is known, the average basal phenomena over the period depicted may be directly interpreted by the linear distance along the horizontal axis between the sharp spikes 32 and 33. If a two-channel recorder is employed, it is feasible to also record in a separate trace the basal phenomena with an amplifier 35 connected between the output of the low pass filter 21 and the recorder 17 as shown. A separate power amplifier is provided within the recorder 17 for each of the channels. An exaggerated change in the basal phenomena is shown by the trace 36 in FIG. 2.

Referring now to the voltage-to-time interval converter, an operational amplifier 37 is connected as a current source with its output terminal connected to an integrating capacitor 38 by a resistor 39. The operational amplifier 37 is provided with differential input terminals to which voltage signals $e_1$ and $e_2$ are coupled by resistors 41 and 42 such that the voltage across the capacitor 38 is proportional to the integral of the difference $e_1 - e_2$. This is so because the output current from the operational amplifier 37 to the capacitor 38 is proportional to the difference in the input voltages $e_1 - e_2$. When the voltage across the capacitor 38 reaches the peak-point voltage of a unijunction transistor $Q_1$, the latter is triggered and the capacitor 38 is discharged through a resistor 43. The leading edge of that surge of discharge current through the resistor 43 is coupled by a capacitor 44 to the amplifier 18 for superposition on the electrodermal phenomena signal being recorded. Since the rate at which the capacitor 38 is charged to the peak-point voltage of the unijunction transistor $Q_1$ is a function of the input signal $e_1$ coupled to the operational amplifier 37 through a resistor 41, the rate at which the unijunction transistor $Q_1$ is triggered is proportional to the average basal phenomena of the electrodermal phenomena being recorded.

Potentiometers 46 and 47 are provided in order to be able to so adjust $e_1$ and $e_2$ coupled to the differential input terminals of the operational amplifier 37 by resistors 41 and 42 to compensate for variations in the capacitance 38 and the unijunction transistor $Q_1$ due to aging and other factors. The potentiometer 47 is first operated to adjust the time interval between the triggering of the unijunction transistor $Q_1$ with the input signal $e_1$ set equal to zero. The potentiometer 46 is then set to adjust the slope of the voltage-to-time interval conversion function.

While this invention has been described in connection with a particular embodiment, many modifications will be apparent to those skilled in the art, particularly as there are many voltage-to-time interval (or voltage-to-frequency) converters which may be employed to equal advantage in accordance with the teachings of this invention in its broadest aspects. Similarly, there are many low pass filters which may be employed to equal advantage. Accordingly, such modifications are to be included within the true spirit and scope of the invention as defined by the following claims.

We claim:

1. Apparatus for measuring and recording electrodermal phenomena accompanying emotional and other stresses of a subject comprising:
    a pair of electrodes adapted to be connected to said subject at different sites;
    means for applying a constant electrical signal to said electrodes to thereby establish a constant electrical stimulus field in the subject between said sites;
    a recorder having a differential amplifier stage at the input thereof, said amplifier having first and second input terminals adapted to receive two signals the difference between which is to be amplified and recorded;
    means connecting one of said electrodes to one input terminal of said differential amplifier; and
    a low pass filter coupling the other one of said electrodes to the other one of said input terminals of said differential amplifier, whereby said recorder makes a record of an output voltage directly proportional to the electrodermal phenomena between said two sites with automatic suppression of a basal phenomena.

2. Apparatus as defined in claim 1 including means for temporarily reducing the time constant of said filter, whereby said recorder may be more rapidly adjusted to center its trace thereon.

3. Apparatus as defined in claim 1 including means for voltage dividing the signal coupled by said filter to the other one of said input terminals of said differential amplifier whereby a portion of said basal phenomena is added to the electrodermal phenomena signal directly connected to said one of said input terminals of said differential amplifier from said one of said electrodes.

4. Apparatus as defined in claim 1 including:
    an integrator having an input and an output terminal;
    means coupling said one of a said electrodes to the input terminal of said integrator;
    a threshold detecting means connected to the output terminal of said integrator for resetting said integrator when the integrated signal therein reaches a predetermined level and, in response to resetting said integrator, for producing a sharp pulse; and
    means for coupling said sharp pulse from said threshold detecting means to said one input terminal of said differential amplifier for recording as a sharp pulse superimposed upon the recorded electrodermal phenomena, the time interval between recorded pulses being directly proportional to the average basal phenomena present between said sites in response to said constant electrical stimulus.

5. Apparatus as defined in claim 4 including means for temporarily reducing the time constant of said filter while adjusting said recorder.

6. Apparatus as defined in claim 5 including means for voltage dividing the signal coupled by said filter to the other one of said input terminals of said differential amplifier whereby a portion of said average basal voltage is added to the electrodermal phenomena signal directly connected to said one of said input terminals of said differential amplifier from said one of said electrodes.

7. Apparatus as defined in claim 1 in which all common terminals are floating and referenced to a floating power supply in order to avoid spurious current return paths.